3,459,440
BELT RETRACTING DEVICE
Thomas Hopka, Belleville, and Robert W. Stoffel, Ferndale, Mich., assignors to Jim Robbins Seat Belt Company, Royal Oak, Mich., a corporation of Delaware
Filed Jan. 9, 1967, Ser. No. 608,000
Int. Cl. B60r 21/10; A62b 35/02
U.S. Cl. 280—150
10 Claims

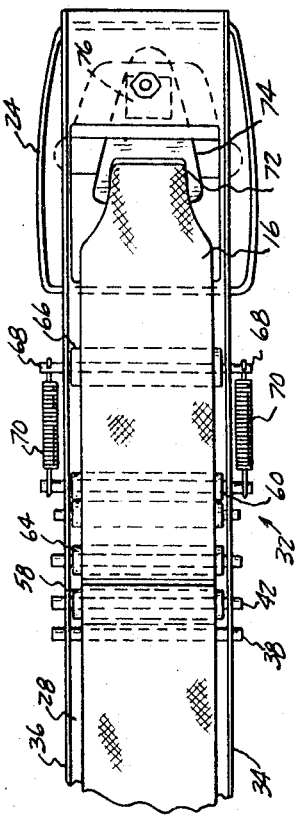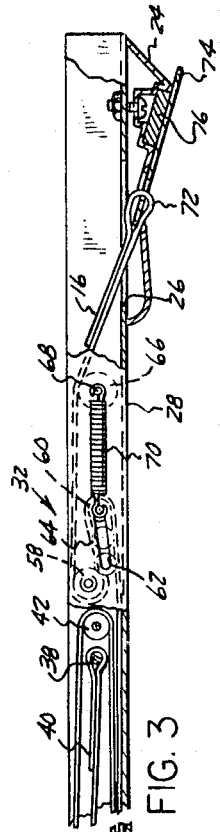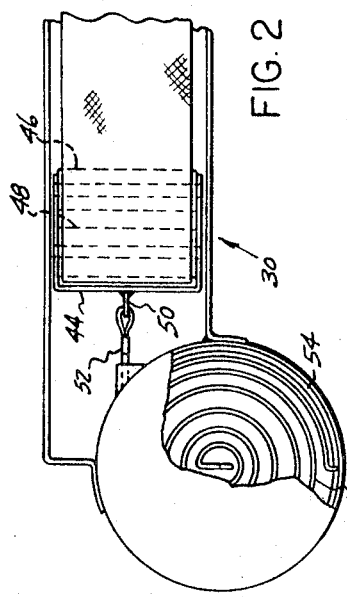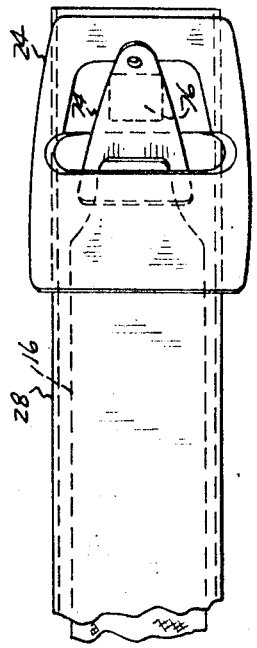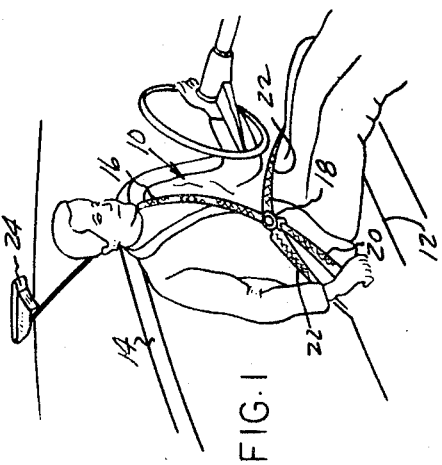
INVENTORS
THOMAS HOPKA
ROBERT W. STOFFEL
ATTORNEYS United States Patent Office 3,459,440
Patented Aug. 5, 1969

ABSTRACT OF THE DISCLOSURE

A retracting device for the safety belt of a vehicle having a locking mechanism preventing an excessive belt feed-out rate. The locking mechanism includes a first fixed roller member and a second roller member mounted for movement toward the first roller member in response to a pull-out force applied to a belt section wrapped around the rollers. An excessive pull-out force causes the movable roller member to clamp the belt between itself and the fixed roller member.

BACKGROUND OF THE INVENTION

Field of the invention

This invention relates to safety belts for the occupants of motor vehicles and more particularly to a retracting device for storing the unused length of a safety belt within a housing and having a locking device permitting normal feed-out of the belt from the housing but preventing feed-out at an excessive rate such as produced by the inertial forces developed by a sudden deceleration of the vehicle tending to displace the restrained body within the vehicle.

Description of the prior art

Recent congressional interest in improved motor vehicle safety features has manifested itself in Federal Safety Standards aimed at improving the overall safety characteristics of motor vehicles. One area which has received considerable attention is related to seat belt systems arranged to prevent sudden relative displacement of the occupants of the vehicle from their seated position as the result of a sudden deceleration of the vehicle. Considerable attention has been focused on a combination lap belt and shoulder harness system. In general, such systems employ a plurality of belt sections each having one end anchored to a fixed structure of the vehicle and their opposite free ends coupled by a suitable buckle mechanism to a companion section, the coupled companion halves arranged to partially embrace the torso of a passenger occupying a seat.

Three major problems have manifested themselves in conventional restraint systems employing such a series of interconnected belts. First, a relatively simple and reliable device for storing the loose belts within a suitable housing and which at the same time permits a section of belting corresponding to the physical dimensions of the particular individual to be easily withdrawn from the housing has not been available.

A second problem of particular significance with regard to systems employing a shoulder harness is related to the position for anchoring the fixed end of the belt. Conventionally the fixed end of the shoulder harness belt section has been connected to the floor panel or a body pillar. A problem associated with a floor panel connection is that under a high impact situation, there is sufficient give in the belt to permit the seat back to pivot forwardly thus permitting a forward displacement of the occupant.

The third and most serious problem associated with conventional shoulder harness retracting devices lies in the general lack of public acceptance for a harness device which restrains the occupant from performing normal body movements. Conventional restraint systems restrict the occupant from performing operations beyond his effective arm length reach such as operating a radio, cigarette lighter and the like. Some elaborate efforts have been made to provide a slack in the shoulder harness by inertia devices which tighten under sudden belt acceleration, however, they have proven to be cumbersome, expensive and not completely satisfactory.

Summary

The preferred embodiment of the present invention obviates the aforementioned problems in addition to providing some special advantages in belt retracting devices. The preferred belt retracting mechanism is described with reference to a belt section disposed within an elongated housing anchored to a fixed structure of the vehicle. The housing has an open end permitting the free end of the belt to be withdrawn therefrom by a pulling effort. A take-up unit disposed within the housing is associated with the mid-portion of the belt and takes the form of a series of spring biased take-up rollers which are movable toward and away from an anchor pin. The take-up rollers are biased for a normal movement away from the anchor pin so that the belt which is wrapped therearound tends to withdraw the free end of the belt into the open end of the housing.

The housing is preferably arranged such that the belt is anchored to the roof and slightly behind the seat of the occupant so that the shoulder harness not only prevents sudden forward movement of the occupant relative to the vehicle but in addition develops a tensile force preventing the seat from pivoting about its horizontal pivot points.

The feed-out of the belt from the housing is controlled by a pair of spaced apart locking rollers. The belt is threaded around the locking rollers which are relatively movable from a normally spaced apart position in response to the feed-out of the belt toward an engaged position wherein the locking rollers approach one another to clamp the belt therebetween and prevent further feed-out. One of the rollers is spring-biased away from the opposite fixed roller so that the locking rollers are spaced apart to permit relatively slow normal feed-out of the belt section. The spring bias means permits the locking rollers to clamp the belt section at a fixed extended length when a force tending to produce an excessive feed-out is applied to the belt.

Thus, the occupant of the vehicle has freedom to carry out normal body movements as the belt moves into and out of its takeup unit unrestrained by the cooperating locking members. However, high impact conditions tending to produce a sudden displacement of the occupant relative to his seat causes the locking members to clamp on the belt thereby preventing further feed-out of the belt from its takeup unit and thus effectively restrains the occupant from further movement with respect to the vehicle.

It is therefore an object of the present invention to provide means for housing a shoulder harness having a take-up unit permitting a selected length of belt to be conveniently withdrawn from the housing and which provides a retraction of the full length of the belt when not in actual use.

It is another object of the present invention to provide a retractable take-up mechanism for a restraint system employing a shoulder harness which restrains the forward displacement of the occupant of a seat in addition to preventing the back rest of the seat from pivoting forward by mounting the take-up device on the roof of the vehicle and behind the seat of the occupant.

It is another object of the present invention to provide a retracting mechanism which permits the occupant of the vehicle sufficient freedom of movement to carry on normal body motions but which responds to a force tending to produce an excessive feed-out rate by clamping the belt to a fixed withdrawn belt section embracing the occupant.

It is still another object of the present invention to provide a belt locking mechanism having a pair of cooperating locking rollers around which the belt is threaded and supported by means producing relative movement of the locking roller members from a spaced position to a belt-clamping position in response to a force tending to produce an excessive movement of the belt between the rollers.

It is still a further object of the present invention to provide a retractable belt device permitting a variable belt section to be withdrawn therefrom to accommodate different physical dimensions corresponding to various individuals which is simple in design and low in manufacturing costs.

Still further objects and advantages of the present invention will readily occur to one skilled in the art to which the invention pertains upon reference to the following detailed description.

Brief description of the drawings

The description makes reference to the accompanying drawings in which like reference characters refer to like parts throughout the several views in which:

FIG. 1 is a perspective view illustrating a harness section embodying the present invention in an operative position to restrain the seated occupant of a vehicle;

FIG. 2 is an enlarged plan view of the retracting device of the present invention;

FIG. 3 is an elevational view of the retracting device illustrated in FIG. 2 with portions shown in section for purposes of clarity; and FIG. 4 is an enlarged view of the free end of the belt section magnetically secured to the open end of the housing.

Description of the preferred embodiment

Now referring to the drawings, a preferred restraint system 10 is illustrated for restraining the movement of the occupant of a vehicle relative to a seat comprising a generally horizontal seat portion 12 and a back portion 14. The restraint system 10 includes a shoulder strap 16 coupled by a quick release buckle mechanism 18 to an anchor strap 20 having its lower end affixed to a suitable floor section of the vehicle. A pair of companion lap straps 22 are also arranged with their free ends coupled to the buckle mechanism 18 and their affixed ends anchored to a suitable fixed portion of the vehicle.

The shoulder strap 16 is retractable through a bezel 24 fixed at the open end 26 of a housing 28 supported by the roof of the vehicle. It can be seen that the bezel 24 is positioned such that the shoulder strap 16 may be withdrawn from or retracted into a position behind and above the back section 14 of the seat.

A take-up unit generally indicated at 30 (FIGS. 2–3) and a locking mechanism generally indicated at 32 are disposed within the housing 28 and control the movements of the shoulder strap section 16.

Now considering first in detail the take-up unit 30, the housing 28 includes a pair of spaced apart sidewalls 34 and 36 which support an anchor pin 38 in transverse relationship to the movement of the strap 16 within the housing. The end 40 of the strip 16 is looped around the anchor pin 38 and affixed to itself by any suitable means.

A longitudinally fixed take-up roller 42 is supported for rotation by the sidewalls 34 and 36 adjacent the anchor pin 38.

A U-shaped yoke 44, spaced from the anchor pin 38, carries a pair of take-up rollers 46 and 48. The yoke 44 and the rollers 46 and 48 are movable as a unit toward and away from the anchor pin 38. The shoulder strap 16 is wrapped around the fixed roller member 42 and the rollers 46 and 48 as illustrated.

The yoke 44 is provided with a rearwardly extending lug 50 engaged with a flexible connecting member 52. The opposite end of the connecting member 52 is fixed to a rotatably supported annular member 54. As viewed in FIG. 2, the annular member 54 is urged by a coil spring member 56 in counterclockwise direction so that the yoke 44 is at all times urged in a rearward direction away from the anchor pin 38. It can be seen that as the yoke 44 and the rollers 46 and 48 move toward a rearward position they withdraw the free end of the shoulder strap 16 from the extended position toward the housing 28. A pulling force applied to the shoulder strap 16 out of the housing is opposed by the bias of the spring 56 and moves the yoke 44 toward the anchor pin 38 so that a suitable amount of belting material is unwrapped from the rollers 42, 46 and 48.

The locking device 32 comprises a longitudinally fixed locking roller 58 supported by the sidewalls 34 and 36. A second locking roller 60, spaced in a parallel relationship from the locking roller 58, has ends which are received in elongated slots 62. The slots 62 support the roller 60 for movement toward and away from the roller 58. An idler roller 64 is also carried in the slots 62 between rollers 58 and 60.

A guide roller 66 has extending ends 68 providing means for supporting a pair of spring-bias members 70. Spring-bias members 70 are connected to the ends of the locking roller 60 and normally urge the roller 60 toward an extreme position in the slots 62 spaced away from the locking roller 58.

The strap 16 is wrapped around the locking roller 60, around the roller 58, and then partially around the guide roller 68. It can be seen that a force applied to the strap 16 tending to withdraw the strap from the housing 28 develops a force on locking roller 60 in opposition to the bias of the spring members 70 so that the locking roller 60 and the idler roller 64 move toward the fixed roller 58. The springs 70 have a stiffness chosen so that a force applied to the strap 16 tending to gradually withdraw the belt from the housing 28 permits the idler roller 64 to be spaced from the fixed roller 58 a distance permitting an unrestrained extension of the strap 16. However, when a force is applied to the strap 16 in excess of a predetermined magnitude, the roller 60 and in turn the idler roller 64 move toward the fixed roller 58 so that the strap 16 is clamped between the periphery of the idler roller 64 and the fixed roller 58. The idler roller 64 is arranged such that upon release of the excessive force on the strap 16, the idler roller immediately separates from the fixed roller 58 permitting the strap to again be withdrawn from the housing.

The free end of the strap 16 is looped to engage an elongated aperture 72 in a metallic fastening element 74. In order to prevent the fastening member 74 from hanging in a loose position when the strap 16 is in a fully retracted condition, a magnetic member 76 is carried by the bezel 24 by any suitable means such as by bonding or the like and arranged to attract the fastening member 74 and retain it in a position wherein it is in a raised position abutting a flattened portion of the bezel 24.

Although we have described but one preferred embodiment of our invention, it is obvious that various modifications and revisions can be made therein without departing from the spirit of the invention as expressed in the scope of the appended claims.

Having thus described our invention, we claim:

1. In a vehicle having a seat assembly and overhead body structure above said seat assembly forming a part of the passenger compartment of the vehicle, the combination of an elongated housing fixedly mounted on said overhead body structure with a belt-receiving opening facing said seat assembly, a spool rotatably mounted adjacent one end of the housing, a bias member connected to the spool so as to bias it in a retracting direction, a seat belt connected to the spool so as to be retracted toward a linear position in the housing as the spool is rotated in its retracting direction, and to be extended as the spool is rotated in the opposite direction, means carried on one end of the belt for extending the belt from said housing through said belt-receiving opening toward the seat assembly, and means for anchoring the other end of the belt to the housing.

2. The combination as defined in claim 1, wherein said connecting means fixedly attaches the opposite end of said seat belt to said housing, and said spool is connected to an intermediate section of said belt so as to bias the free end of the belt toward said belt-receiving opening.

3. The combination as defined in claim 1, wherein said anchor means fixedly connects the opposite end of said belt to said housing and including means for releasably connecting said belt at a point intermediate its ends to said housing when at least a portion of said belt has been extended from said housing.

4. In a vehicle having a seat assembly, the combination comprising:
 (a) support means in said vehicle;
 (b) a first roller mounted on said support means for rotation about an axis fixed with respect to said support means;
 (c) a second roller mounted on said support means for rotation about an axis that is substantially parallel to the axis of rotation of the first roller, said second roller being movable toward and away from the first roller;
 (d) bias means urging the second roller away from the first roller and toward a first position in which the second roller is spaced from the first roller; and
 (e) an elongated seat belt supported between said first and second rollers and in contact with a circumferential portion of the second roller to move the second roller toward the first roller and toward a second position in which the belt is clamped between said rollers when the belt is moved with a predetermined motion between said rollers, moving said belt with less than said predetermined motion being inoperative to move the second roller to its second position.

5. The combination as defined in claim 4, in which said bias means is operative to prevent the second roller from moving to its second position as the belt is moved between said first and second rollers with less than said predetermined motion but is inoperative to prevent the second roller from moving to its second position as the belt is moved between said first and second rollers with said predetermined motion.

6. The combination as defined in claim 4, including second bias means connected to said belt for urging the belt in a first direction between said first and second rollers away from said seat assembly, and means carried by said belt for moving the belt in the opposite direction between said first and second rollers and toward said seat assembly.

7. The combination as defined in claim 4, wherein said support means includes a housing having a pair of spaced, generally opposed sidewalls, and a pair of parallel slots in said sidewalls, the second roller being journaled in said slots and movable between opposite ends thereof, the first roller being journaled on said sidewalls adjacent one end of said slots and said bias means being connected to the second roller to urge it toward the opposite ends of said slots.

8. The combination as defined in claim 4, in which the vehicle has overhead structure above said seat assembly, said support means is mounted on said overhead structure, and including bias means connected to said belt for biasing the belt in a first direction between said rollers so that one end of the belt is biased toward said overhead structure, and means carried on said one end of the belt for moving the belt in the opposite direction through said first and second rollers toward the seat assembly.

9. The combination as defined in claim 4, in which the vehicle has overhead structure above said seat assembly, and including an elongated housing mounted on said overhead structure adapted to support said first and second rollers for rotation within said housing, said housing having an opening for said belt spaced in a first longitudinal direction from said first and second rollers; second bias means mounted in said housing in the opposite longitudinal direction from said rollers with respect to said opening; and wherein said belt has a first portion disposed in said housing and a second portion extended out of said housing, said second bias means being coupled to the first portion of said belt to urge the belt in a first direction between the said rollers so that the second portion is moved through said opening into said housing; and including means carried on the second portion of the belt to move the belt in the opposite direction between said rollers so that the first portion of said belt is moved through said opening out of said housing, said belt being wrapped around a portion of the second roller so that a predetermined motion of the belt in said opposite direction moves the second roller to its second position in which the belt is connected to said housing.

10. The combination as defined in claim 9, wherein the means carried on the second portion of the belt comprises a metal fastening element, and including magnetic means mounted adjacent the opening of said housing engageable with said fastening element to prevent the belt from being entirely retracted into said housing by said second bias means.

References Cited

UNITED STATES PATENTS

| | | | |
|---|---|---|---|
| 2,898,976 | 8/1959 | Barecki | 280—150 |
| 3,236,540 | 2/1966 | Berton, et al. | 280—150 |
| 3,237,265 | 3/1966 | Florian | 24—230 |
| 3,257,146 | 6/1966 | Mahoney | 297—388 |
| 3,292,744 | 12/1966 | Replogle | 188—135 |
| 3,343,765 | 9/1967 | Baker | 242—107.1 |

BENJAMIN HERSH, Primary Examiner

JOEL E. SIEGEL, Assistant Examiner

U.S. Cl. X.R.

297—388